(12) United States Patent
Tanabe et al.

(10) Patent No.: US 9,975,515 B2
(45) Date of Patent: May 22, 2018

(54) SIDE AIRBAG DEVICE

(71) Applicant: TS TECH CO., LTD., Asaka-shi, Saitama (JP)

(72) Inventors: Jinichi Tanabe, Tochigi (JP); Hiroyuki Kaku, Tochigi (JP); Ken Nakamura, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 164 days.

(21) Appl. No.: 14/784,601

(22) PCT Filed: Apr. 18, 2014

(86) PCT No.: PCT/JP2014/061024
§ 371 (c)(1),
(2) Date: Oct. 15, 2015

(87) PCT Pub. No.: WO2014/171531
PCT Pub. Date: Oct. 23, 2014

(65) Prior Publication Data
US 2016/0068129 A1 Mar. 10, 2016

(30) Foreign Application Priority Data

Apr. 19, 2013  (JP) ................................ 2013-088246
Apr. 19, 2013  (JP) ................................ 2013-088249

(51) Int. Cl.
B60R 21/207 (2006.01)
B60R 21/216 (2011.01)
(Continued)

(52) U.S. Cl.
CPC ............ *B60R 21/207* (2013.01); *B60N 2/449* (2013.01); *B60R 21/216* (2013.01);
(Continued)

(58) Field of Classification Search
CPC ....... B60R 21/16; B60R 21/20; B60R 21/207; B60R 21/217; B60R 21/2171; B60R 2021/161
(Continued)

(56) References Cited

U.S. PATENT DOCUMENTS 5,647,607 A * 7/1997 Bolieau ................. B60R 21/215
280/728.2
5,762,363 A * 6/1998 Brown .................. B60R 21/207
280/728.2

(Continued)

FOREIGN PATENT DOCUMENTS

CN 101746338 6/2010
DE 102006057590 A1 * 6/2008 ............. B60R 21/04
(Continued)

OTHER PUBLICATIONS

Office Action issued in counterpart Japanese Patent Application No. 2015-162393 dated Apr. 19, 2016, and corresponding English translation.
(Continued)

*Primary Examiner* — Karen Beck
(74) *Attorney, Agent, or Firm* — Hamre, Schumann, Mueller & Larson, P.C.

(57) ABSTRACT

A side airbag device includes: an inflator configured to inject gas into an airbag; a case including a mount wall for the inflator to be mounted thereto; an inflator anchoring member provided on a side of the mount wall opposite to an inflator side and attached to the inflator by a mounting member with the mount wall held between the inflator anchoring member and the inflator; an outer covering material configured to cover the case; a restriction member fixed at a position around a seam of the outer covering material and configured to restrict a direction of deployment of the airbag; and an engaging portion provided at an end portion of the restric-
(Continued)

tion member and configured to engage with the case, the engaging portion being located in place at the case, to thereby be restricted in movement.

19 Claims, 17 Drawing Sheets

(51) Int. Cl.
  *B60N 2/44* (2006.01)
  *B60R 21/231* (2011.01)
  *B60N 2/58* (2006.01)
  *B60R 21/16* (2006.01)

(52) U.S. Cl.
  CPC ............ *B60R 21/23138* (2013.01); *B60N 2002/5808* (2013.01); *B60R 2021/161* (2013.01); *B60R 2021/2076* (2013.01); *B60R 2021/2078* (2013.01); *B60R 2021/23146* (2013.01)

(58) Field of Classification Search
  USPC .............. 280/728.2, 728.3, 730.2, 743.1
  See application file for complete search history.

(56) References Cited

U.S. PATENT DOCUMENTS

| | | | | |
|---|---|---|---|---|
| 5,938,232 | A * | 8/1999 | Kalandek | B60R 21/207 280/728.3 |
| 6,206,410 | B1 | 3/2001 | Brown | |
| 6,299,197 | B1 | 10/2001 | Mueller | |
| 7,284,768 | B2 * | 10/2007 | Tracht | B60R 21/207 280/728.2 |
| 7,669,889 | B1 * | 3/2010 | Gorman | B60R 21/207 280/730.2 |
| 7,971,900 | B2 * | 7/2011 | Lim | B60R 21/207 280/730.2 |
| 8,474,858 | B2 * | 7/2013 | Urabe | B60R 21/207 280/728.2 |
| 8,752,861 | B2 | 6/2014 | Fukawatase et al. | |
| 8,919,878 | B2 | 12/2014 | Sakamoto | |
| 9,039,096 | B2 | 5/2015 | Nakanishi et al. | |
| 9,346,431 | B1 * | 5/2016 | Kim | B60R 21/2338 |
| 9,598,040 | B2 * | 3/2017 | Tanabe | B60R 21/207 |
| 2007/0187933 | A1 * | 8/2007 | Tracht | B60R 21/207 280/730.2 |
| 2008/0238057 | A1 * | 10/2008 | Inoue | B60R 21/0134 280/735 |
| 2009/0039623 | A1 | 2/2009 | Kawabe et al. | |
| 2013/0175792 | A1 * | 7/2013 | Fukawatase | B60N 2/289 280/728.2 |
| 2013/0320744 | A1 | 12/2013 | Sakamoto | |
| 2014/0110987 | A1 | 4/2014 | Nakanishi et al. | |
| 2016/0068129 | A1 * | 3/2016 | Tanabe | B60N 2/449 280/728.3 |

FOREIGN PATENT DOCUMENTS

| | | |
|---|---|---|
| EP | 2799281 | 11/2014 |
| JP | 10-203294 A | 8/1998 |
| JP | 2001-88649 A | 4/2001 |
| JP | 2002-67857 A | 3/2002 |
| JP | 2009-40328 A | 2/2009 |
| JP | 2013100045 | 5/2013 |
| JP | 5884644 | 3/2016 |
| JP | 5892788 | 3/2016 |
| JP | 5929700 | 6/2016 |
| WO | 2012/035619 A1 | 3/2012 |

OTHER PUBLICATIONS

Extended European Search Report issued in counterpart European Patent Application No. 14785450.9 dated Apr. 6, 2016.
Office Action for Chinese application No. 201480021771.7, dated Aug. 2, 2016, 13 pages including English translation.
Office Action issued for corresponding Japanese Patent Application No. 2015-162393, dated Jan. 31, 2017, 5 pages including English translation.
Office Action issued for corresponding Chinese Patent Application No. 201480021771.7, dated Feb. 6, 2017, 16 pages including English translation.
International Search Report issued in PCT/JP2014/061024, dated Jun. 17, 2014 (2 pages).
Office Action issued for Japanese Patent Application No. 2015-162393, dated Oct. 25, 2016, 8 pages including English translation.
Office Action issued for Japanese Patent Application No. 2013-088246, dated Dec. 20, 2016, 6 pages including English translation.

* cited by examiner

FIG.19
(a)
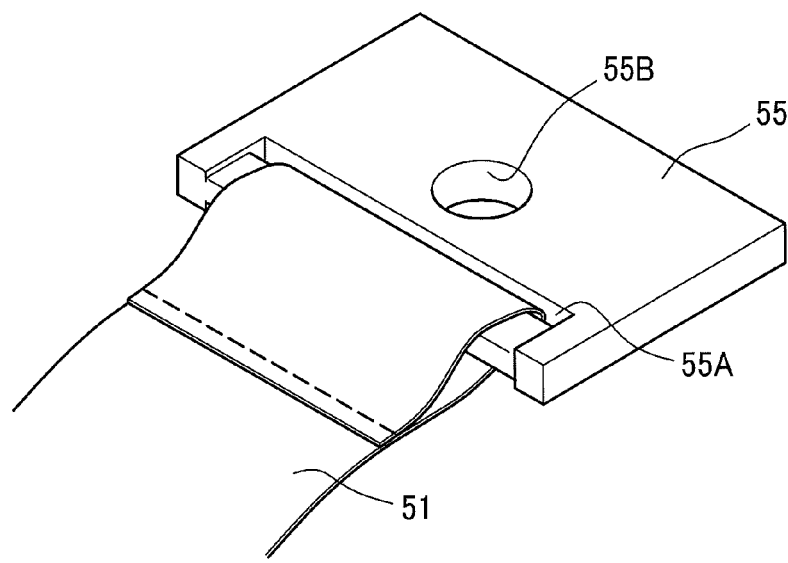
(b)
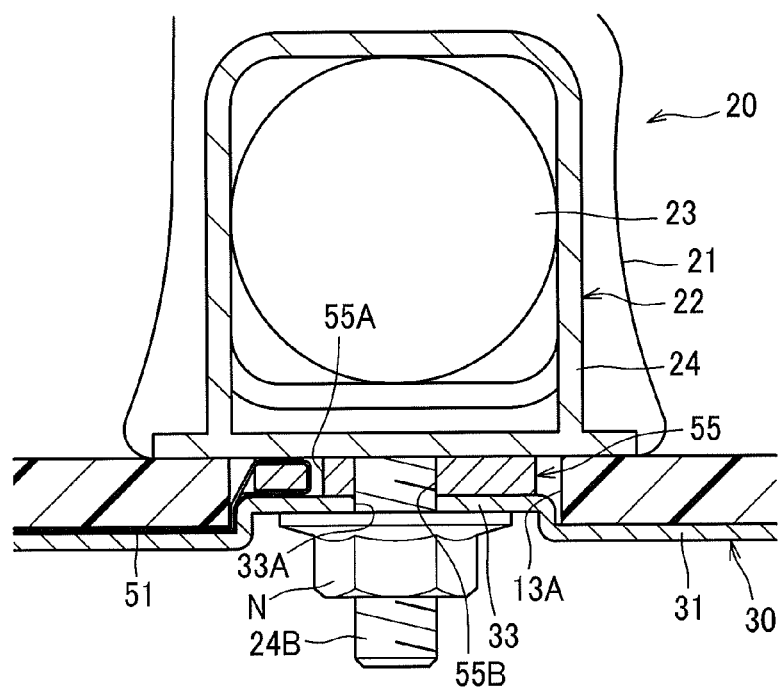

ID E AIRBAG DEVICE

TECHNICAL FIELD

The present invention relates to a side airbag device provided between a vehicle body and a back seat.

BACKGROUND ART

A side airbag device which includes an inflator for injecting gas into an airbag, a plastic cover covering the airbag and the inflator at the front side, and a metal box for mounting the inflator to the cover is hitherto known in the art (see JP 2009-40328 A). To be more specific, in this technique, when the airbag is inflated by the inflator, the airbag will break a thin-walled portion of the plastic cover to thereby inflate and deploy.

SUMMARY OF INVENTION

One conceivable configuration adoptable into the aforementioned side airbag device is such that a seam of an outer covering is ripped by an airbag so that the airbag is allowed to inflate and deploy. For this configuration, it may be conceivable that one end of webbing is fixed near the seam of the outer covering while the other end of the webbing is held by an inflator-side member so that upon inflation and deployment of the airbag, the seam is caused to be ripped from a region of the seam at which the webbing is fixed. In this instance, however, the other end of the webbing may receive a great force acted thereon by a pressure of deployment of the airbag, and thus needs to have an increased firm holding structure.

With this in view, the inventors named in the present application have created the present invention in an attempt to provide a side airbag device in which an inflator-side end portion of webbing (restriction member) can be held firmly.

Also, through this effort, the possibilities of successful weight reduction in the side airbag device and increased stiffness in an inflator-mounting structure have been discovered.

In one or more of embodiments which will be described later, there is provided a side airbag device provided between a vehicle body and a back seat. This side airbag device comprises: an inflator that is configured to inject gas into an airbag; a case that includes a mount wall for the inflator to be mounted thereto; an inflator anchoring member that is provided on a reverse side of the mount wall opposite to a side on which the inflator is to be mounted, the inflator anchoring member being attached to the inflator by a mounting member with the mount wall held between the inflator anchoring member and the inflator; an outer covering material that is configured to cover the case; a restriction member that is fixed at a position around a seam of the outer covering material, and configured to restrict a direction of deployment of the airbag; and an engaging portion that is provided at an end portion of the restriction member, and configured to engage with any of the inflator, the inflator anchoring member, the mounting member or the case. The engaging portion is located in place at the any of the inflator, the inflator anchoring member, the mounting member or the case, to thereby be restricted in movement.

With this configuration, the engaging portion is configured to engage with any of the inflator anchoring member or the like, whereby the engaging portion is located in place and restricted in movement from the position in which it is located in place; therefore, the end portion of the restriction member can be held firmly at the inflator-side component(s).

In the configuration described above, the engaging portion may be provided by sewing at the end portion of the restriction member.

With this feature, for example, as compared with an alternative configuration in which a clip engageable with the case or the like is provided as an engaging portion at the end portion of the restriction member, the structure of the restriction member can be simplified, and by extension the side airbag device can be made simple in construction.

In the configuration described above, the restriction member may be held between the inflator and the inflator anchoring member.

With this feature, the end portion of the restriction member can be held firmly at the inflator-side component(s).

In the configuration described above, the engaging portion may be configured to be engaged with a hole provided in the case. Preferably, the engaging portion that is configured to be fitted in the hole may be desirable.

These features can serve to reduce the likelihood of letting the engaging portion come off the hole, and thus the end portion of the restriction member can be held firmly at the inflator-side component(s).

In the configuration described above, where the hole has a bottom, the engaging portion may be in sheet form and positioned parallel to the bottom of the hole.

With this feature, the depth of the hole can be designed to be shallower, and thus the volume of a portion surrounding the hole can be made smaller, so that the case can be made lighter in weight. Moreover, the making of the hole can be easier, so that the case can be made with increased ease.

The configuration described above may be further configured such that the engaging portion is folded back at least one time and disposed in the hole, wherein the restriction member is routed to pass along one end of the engaging portion inside the hole, and to extend out of the hole further toward another end of the engaging portion.

With this feature, upon inflation of the airbag which causes the restriction member to be pulled, the engaging portion is caused to rotate, and the aforementioned another end of the engaging portion is pressed against the bottom of the hole, so that the likelihood of letting the engaging portion come off the hole can be reduced more effectively, and thus the end portion of the restriction member can be held firmly at the inflator-side component(s).

In the configuration described above, where the engaging portion is in sheet form, the hole may be in slit form, and configured to hold both sides of the engaging portion.

With this feature, the likelihood of letting the engaging portion come off the hole can be reduced more satisfactorily, and thus the end portion of the restriction member can be held firmly at the inflator-side component(s).

In the configuration described above, the hole may be arranged so as not to overlap the inflator when viewed from a direction in which the inflator and the inflator anchoring member holds the restriction member.

Since this configuration provides the hole out of a region of the mount wall between the inflator and the inflator anchoring member, the thickness of that region can be reduced, so that the inflator and the inflator anchoring member can be firmly fixed together, and the stiffness in the inflator-mounting structure can be increased.

In the configuration described above, the mounting member may be provided in more than one position arranged in an axial direction of the inflator, and the hole may be provided between two adjacent mounting members selected from those provided in the more than one position.

With this feature, the end portion of the restriction member can be held more firmly at the inflator-side component(s).

In the configuration described above, the hole may be equivalent in position along an axial direction of the inflator to the mounting member.

With this feature, the end portion of the restriction member can be held more firmly at the inflator-side component(s).

In the configuration described above, the mounting member may be provided in more than one position arranged in an axial direction of the inflator, and the hole may be provided on an outer side, in the axial direction, of the mounting member provided in more than one position.

BRIEF DESCRIPTION OF DRAWINGS

FIG. 19 includes (a) a perspective view showing a modified example 10 of the side airbag device; and (b) a sectional view thereof.

DESCRIPTION OF EMBODIMENTS

Hereafter, a first embodiment of the present invention will be described with reference to the drawings.

Figure 1:
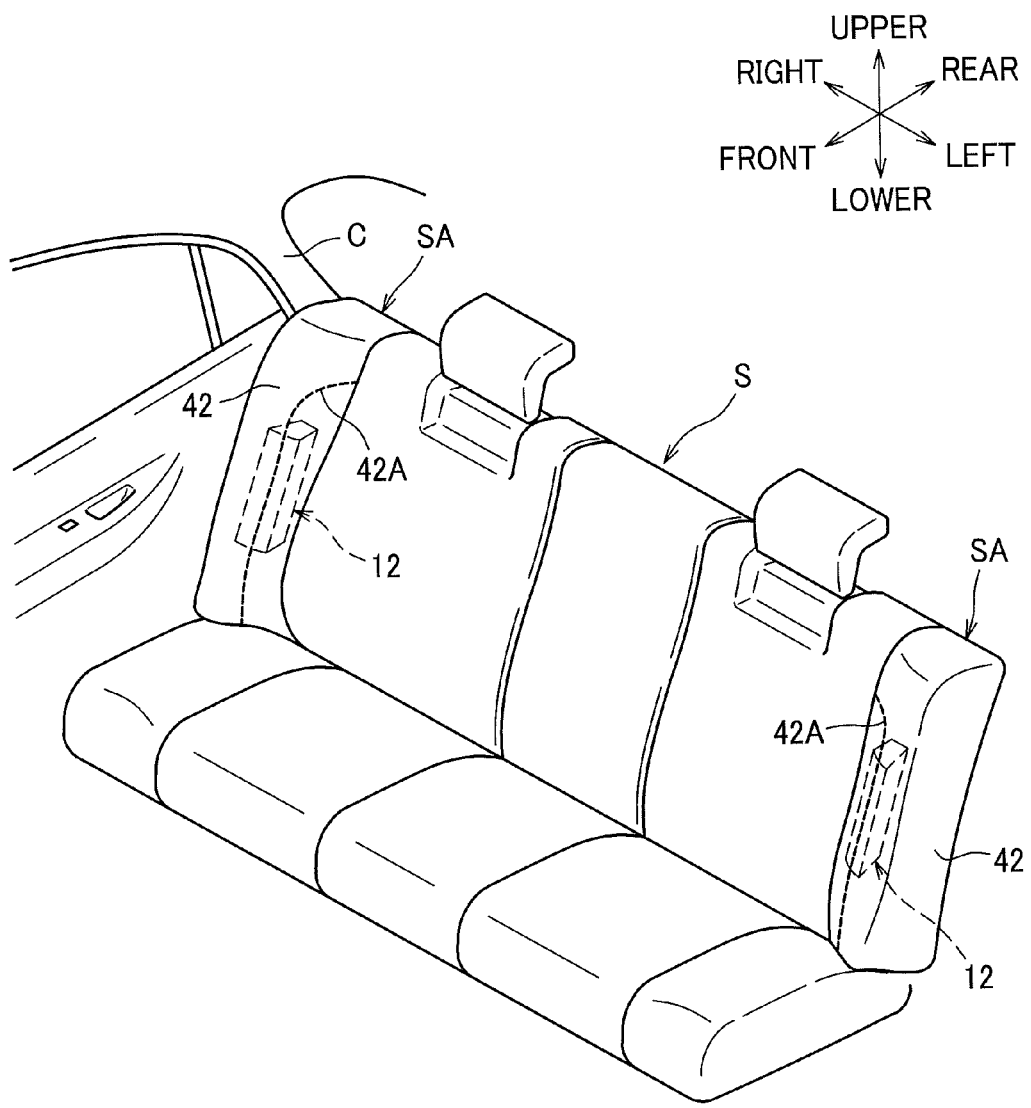
FIG. 1 is a perspective view showing a side airbag device according to a first embodiment.

As shown in FIG. 1, a side airbag device SA is formed to have an elongate shape extending in an upward-downward direction, and is provided between a vehicle body C and a back seat S. In this description, the terms front/rear, left/right (or lateral), and upper/lower (or upward/downward) are used to designate directions with reference to a person seated in the back seat S. Since the left and right side airbag devices SA are configured to be bilaterally symmetric, the following description will illustrate the right side airbag device SA as an exemplar, and a description of the left side airbag SA will be omitted.

Figure 2:
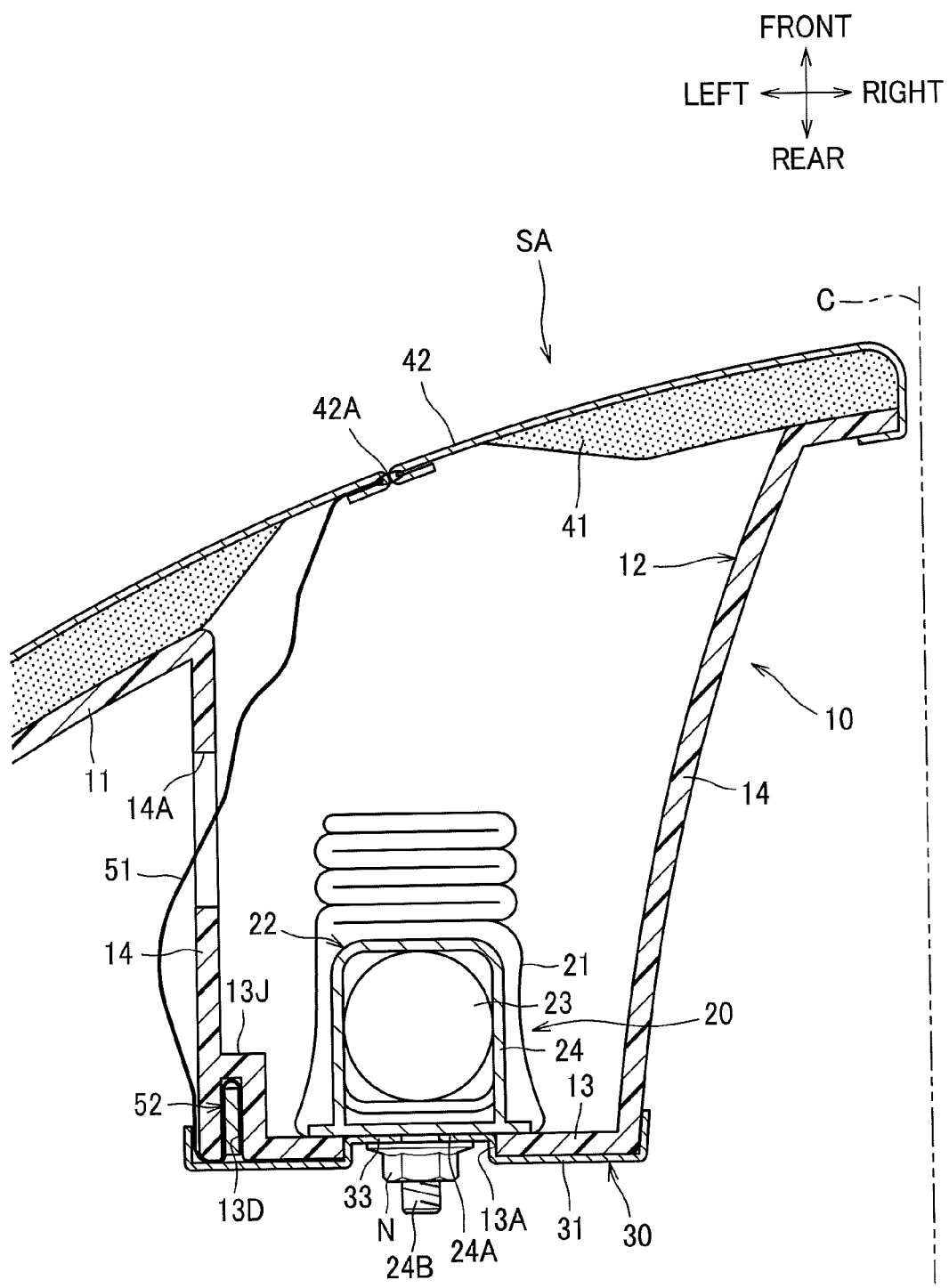
FIG. 2 is a sectional view showing the side airbag device according to the first embodiment.

As shown in FIG. 2, the side airbag device SA mainly includes a case 10, an airbag unit 20 accommodated in the case 10, an anchor plate 30 as one example of an inflator anchoring member, a cushion member 41 made of urethane foam or the like, and an outer covering material 42 made of synthetic leather or fabric.

The case 10 is a plastic member that defines the shape of an external appearance of the side airbag device SA, and is formed to have an elongate shape extending in an upward-downward direction. The case 10 includes a front wall portion 11, and a recess-shaped portion 12 formed to be recessed from the front wall portion 11 rearward.

The cushion member 41 and the outer covering material 42 are attached to the front wall portion 11 so as to cover the front side of the front wall portion 11. The outer covering material 42 has two ends sewn together with thread or the like and thus-sewn ends are positioned to face on the recess-shaped portion 12 in the front-rear direction. A seam 42A formed with the two ends of the outer covering material 42 sewn together with thread or the like is provided, as shown in FIG. 1, to extend in the upward-downward direction from a lower side upward through a lower end of the side airbag device SA, and further extend toward a laterally inner side.

At a position around the seam 42A, to be more specific, near a portion of the seam 42A which has an elongate shape extending substantially in the upward-downward direction, an end portion of webbing 51 as one example of a restriction member configured to restrict a direction of deployment of an airbag 21 that will be described later is fixed. It is to be understood that the webbing 51 in the present embodiment is formed of an elongate fabric that is less elastic than the outer covering material 42.

The recess-shaped portion 12 includes a bottom wall 13 as one example of a mount wall, and a side wall 14 extending from a peripheral edge of the bottom wall 13 frontward (on a side opposite to a side on which the anchor plate 30 is provided). As shown in FIG. 3(a), the bottom wall 13 is in the form of a rectangular sheet extending in a direction perpendicular to the front-rear direction and elongate in the upward-downward direction with two mounting holes 13A (first opening) formed in appropriate positions. Each mounting hole 13A is a circular hole for mounting the airbag unit 20 and the anchor plate 30 on the bottom wall 13, and so shaped, sized and positioned as to allow two protuberant portions 33 that will be described later to be fitted therein.

In an appropriate position on the bottom wall 13, to be more specific, in a position between the mounting holes 13A in the upward-downward direction and shifted leftward of the mounting holes 13A, a bulging portion 13J protruding frontward is formed. As shown in FIG. 3(b), the bulging portion 13J has a hole 13D that opens to the rear. In this hole 13D, an engaging portion 52 provided by sewing at the end portion of the webbing 51 is fitted. With this configuration, the engaging portion 52 is located in place at the case 10, to thereby be restricted in movement from the position in which the engaging portion 52 is located, so that the end portion of the webbing 51 can be held firmly at the inflator 22 side component (a description of the inflator 22 will be given later). Details of the hole 13D and the engaging portion 52 will be described later.

As shown in FIG. 3(a), the side wall 14 is in the form of a rectangular tube, and its left side (on the laterally inner side) portion has a through hole 14A (second opening) for allowing the webbing 51 to be passed therethrough from the inside of the recess-shaped portion 12 to the outside.

As shown in FIG. 2, the airbag unit 20 is provided inside the recess-shaped portion 12 of the case 10, and mainly includes an airbag 21, and an inflator 22 configured to inject gas into the airbag 21. The inflator 22 is provided inside the airbag 21, and as shown in FIG. 3(a), includes a substantially cylindrical gas generator 23 and the retainer 24 configured to retain the gas generator 23. The recess-shaped portion 12 of the case 10 is formed such that an opening (at its front end from which the airbag 21 deploys) covered by the outer covering material 42 is laterally wider than the bottom wall 13 to which the airbag unit 20 is fixed; therefore, the airbag unit 20 is easy to handle when it is mounted to the case 10.

The retainer 24 is made by shaping sheet metal into the form of a substantially rectangular tube, and configured to hold the gas generator 23 in its inside. A rear surface 24A that is a contact surface of the retainer 24 contactable with the bottom wall 13 is a flat surface parallel to a front side 13B; in appropriate positions on the rear surface 24A, two external thread portions 24B as one example of a mounting member are provided integrally therewith and configured to protrude rearward. To be more specific, the two external thread portions 24B are spaced out in the upward-downward direction (in the axial direction of the inflator 22). Each external thread portion 24B protrudes through a hole (not shown) formed in the airbag 21 out of the airbag 21.

The anchor plate 30 is a metal plate provided on the rear side (reverse side opposite to the side on which the inflator 22 is to be mounted) of the bottom wall 13 of the recess-shaped portion 12, and includes a rectangular main body 31 perpendicular to the front-rear direction and elongate in the upward-downward direction, and two flange portions 32 extending respectively from left and right sides of the main body 31 frontward. In appropriate positions on the main body 31, two frontwardly-protruding protuberant portions 33 each having a cylindrical shape with a bottom are formed.

Each protuberant portion 33 is formed by press working to have a contour recessed toward the inflator 22, and arranged to protrude through a corresponding mounting hole 13A of the bottom wall 13 of the recess-shaped portion 12 toward the retainer 24. In an end portion of each of the protuberant portions 33, one insertion hole 33A for allowing each corresponding external thread portion 24B of the retainer 24 to be inserted is provided. In other words, each insertion hole 33A is formed to have an appropriate size and arranged in an appropriate position as conformable to the position and size of the corresponding external thread portion 24B.

When a nut N as one example of a mounting member is screwed on a corresponding external thread portion 24B that has been so inserted in each insertion hole 33A as to protrude rearward through the anchor plate 30, the retainer 24 and each protuberant portion 33 of the anchor plate 30 are fastened together with the bottom wall 13 being held between the retainer 24 and the anchor plate 30, while a very thin sheet of the airbag 21 is held between the retainer 24 and the protuberant portion 33 of the anchor plate 30. Such a manner of fastening between the retainer 24 and the respective protuberant portions 33 of the anchor plate 30 with just a very thin sheet of the airbag 21 held therebetween can be regarded as if to have virtually direct metal-to-metal fastening achieved, and thus the retainer 24 and the anchor plate 30 can be firmly fixed together, with the result that the stiffness in structure for mounting the inflator 22 to the bottom wall 13 can be increased.

It may be preferable that the end face of each protuberant portion 33 be disposed in a position retreating slightly rearward from the front side 13B of the bottom wall 13 when the main body 31 of the anchor plate 30 is in contact with the bottom wall 13 of the recess-shaped portion 12. With this configuration, once the retainer 24 and the anchor plate 30 are fastened together, the bottom wall 13 can be firmly held between the retainer 24 and the anchor plate 30, so that the inflator 22 can be attached firmly to the bottom wall 13.

Each protuberant portion 33 is dimensioned to have a diameter substantially equal to that of each mounting hole 13A in the bottom wall 13 of the recess-shaped portion 12. With this configuration, each protuberant portion 33 can be fitted in the corresponding mounting hole 13A in the bottom wall 13 of the recess-shaped portion 12, and thus the anchor plate 30 can be located in place at the bottom wall 13.

The flange portions 32 are formed by bending at left and right sides of the main body 31 frontward, to thereby enhance the rigidity of the main body 31. The respective flange portions 32 are so formed in positions as to be engageable with the outer surfaces of the recess-shaped portion 12, so that the respective flange portions 32 can also serve to locate the anchor plate 30 laterally in place at the bottom wall 13.

Figure 3:
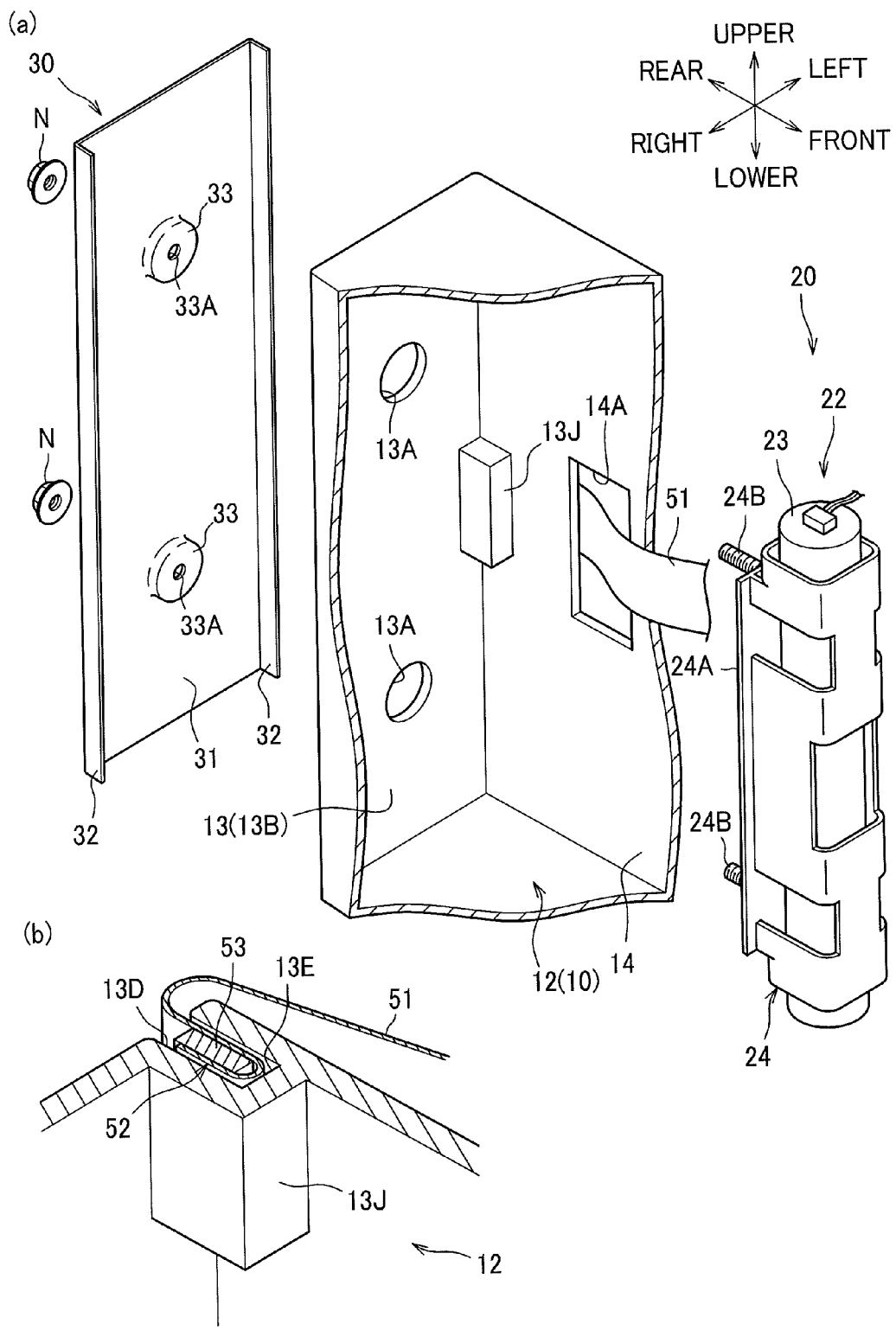
FIG. 3 includes (a) an exploded perspective view showing a structure around an inflator; and (b) a perspective view with a case partially cut away for revealing a hole and an engaging portion.

As shown in FIG. 3 (b), the hole 13D is a tubular hole having one end closed with a bottom surface 13E, and shaped in slit form (elongate in the upward-downward direction). The engaging portion 52 comprises a trim cord 53 in sheet form which is made of rigid or semirigid plastic, and an end portion of the webbing 51; the end portion of the webbing 51 is wound up into a U-shape around the trim cord 53, and the end portion of the webbing 51 and the trim cord 53 are sewn and joined together into sheet form.

The engaging portion 52 shaped in sheet form is fitted in the hole 13D in slit form, so that the both sides of the engaging portion 52 in sheet form are held by the inner peripheral surface of the hole 13D. With this configuration, the engaging portion 52 can be effectively prevented from coming off the hole 13D.

The webbing 51 extending from the hole 13D toward the outside is held, as shown in FIG. 2, together with the bottom wall 13 between the inflator 22 and the anchor plate 30. As described above, the engaging portion 52 is engaged in the hole 13D of the case 10 while the webbing 51 is held between the inflator 22 and the anchor plate 30, whereby the end portion of the webbing 51 can be held firmly at the inflator 22 side.

Figure 4:
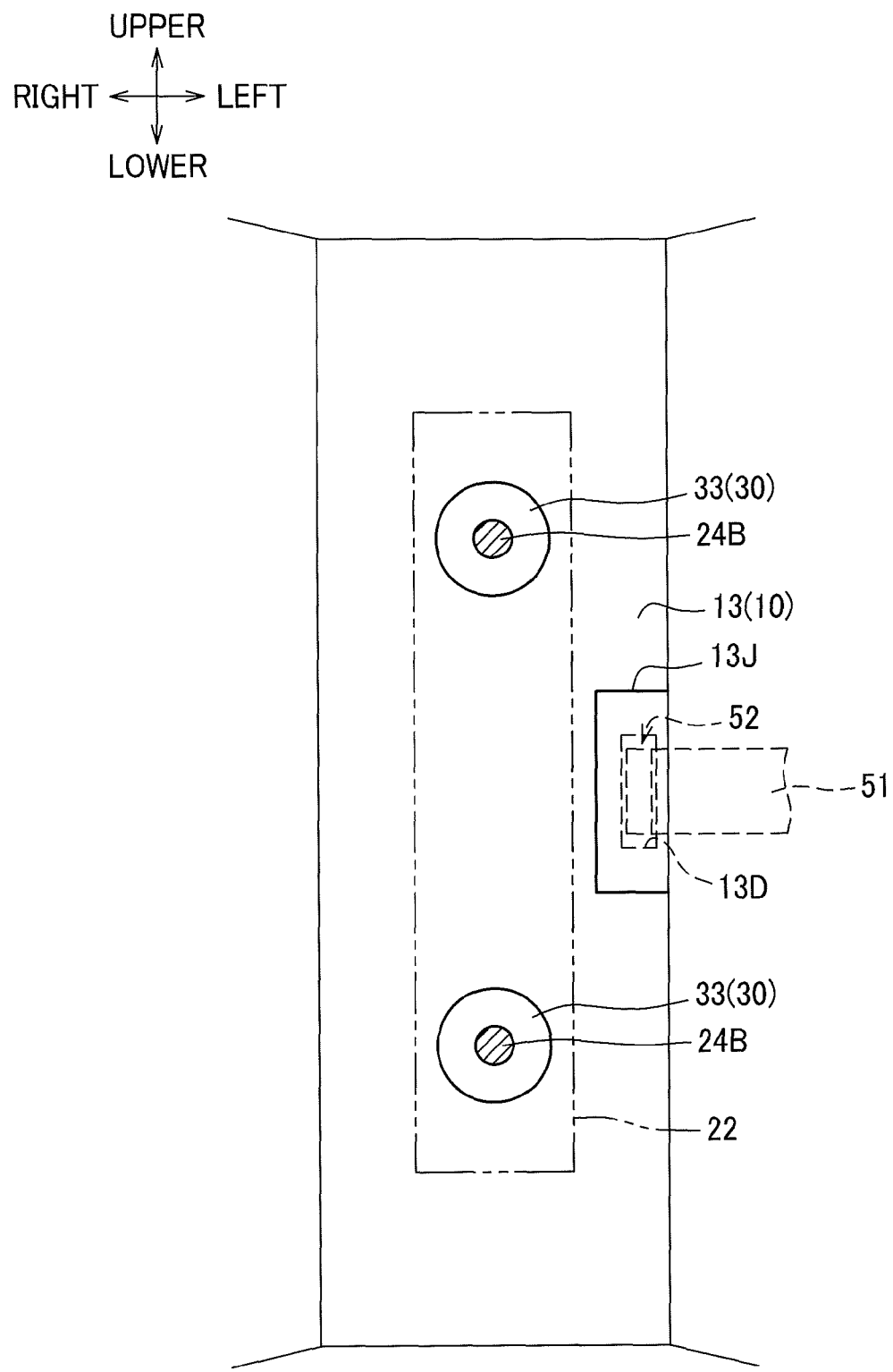
FIG. 4 is a view showing the position of the hole relative to the inflator.

The hole 13D is, as shown in FIG. 4, arranged so as not to overlap the inflator 22 when viewed from the front-rear direction (a direction in which the inflator 22 and the anchor plate 30 holds the webbing 51). In FIG. 4, for convenience's sake, the inflator 22 is shown in chain double-dashed lines.

With this configuration, the hole 13D is not provided in a region of the bottom wall 13 between the inflator 22 and the anchor plate 30 (region defined by the chain double-dashed lines), and thus the thickness of that region can be reduced, so that the inflator 22 and the anchor plate 30 can be firmly fixed together, and the stiffness in the inflator 22-mounting structure can be enhanced.

The hole 13D is provided between the two external thread portions 24B in the upward-downward direction. With this configuration, the webbing 51 and the bottom wall 13 can be firmly held by the portion between the two external thread portions 24B which is considered to be less likely to bend than any other portion in the region in which the retainer 24 and the anchor plate 30 are provided, so that the end portion of the webbing 51 can be held more firmly at the inflator 22 side.

According to the present embodiment described above, the following advantages, in addition to the aforementioned advantages, can be achieved, Since the engaging portion 52 is provided by sewing at the end portion of the webbing 51, the side airbag device SA can be simplified in structure in comparison, for example, with a structure in which a clip engageable with the case is provided at the end portion of the webbing.

Since the rear surface 24A of the retainer 24 is configured to be a flat surface parallel to the front side 13B of the bottom wall 13, an broadened area of coverage of the fastening strength of the external thread portions 24B and the nuts N can be ensured, and thus the degree of flexibility in the arrangement of the engaging portion 52 and the hole 13D can be increased.

Since the through hole 14A for allowing the webbing 51 to pass therethrough is formed in the side wall 14, the rigidity of the bottom wall 13 can be enhanced in comparison, for example, with an alternative construction in which a through hole is formed in the bottom wall; therefore, the end portion of the webbing 51 can be held more firmly at the inflator 22 side.

Since the protuberant portions 33 for directly fastening the metal anchor plate 30 and the metal retainer 24 together are integrally provided in the anchor plate 30, the number of parts can be reduced and the formation of the case 10 can be performed with increased ease, in comparison, for example, with an alternative construction in which the tubular collars made of metal are inserted in a mold and formed integrally with the case so that the retainer and the anchor plate are fastened together through the collars.

The first embodiment of the present invention has been described above, but it is to be understood that the present embodiment can be implemented in a modified form, as will be described below with reference to some other embodiments. In the following description, the same elements in construction as those in the first embodiment will be designated by the same reference numerals, and a description thereof will be omitted.

Figure 5:
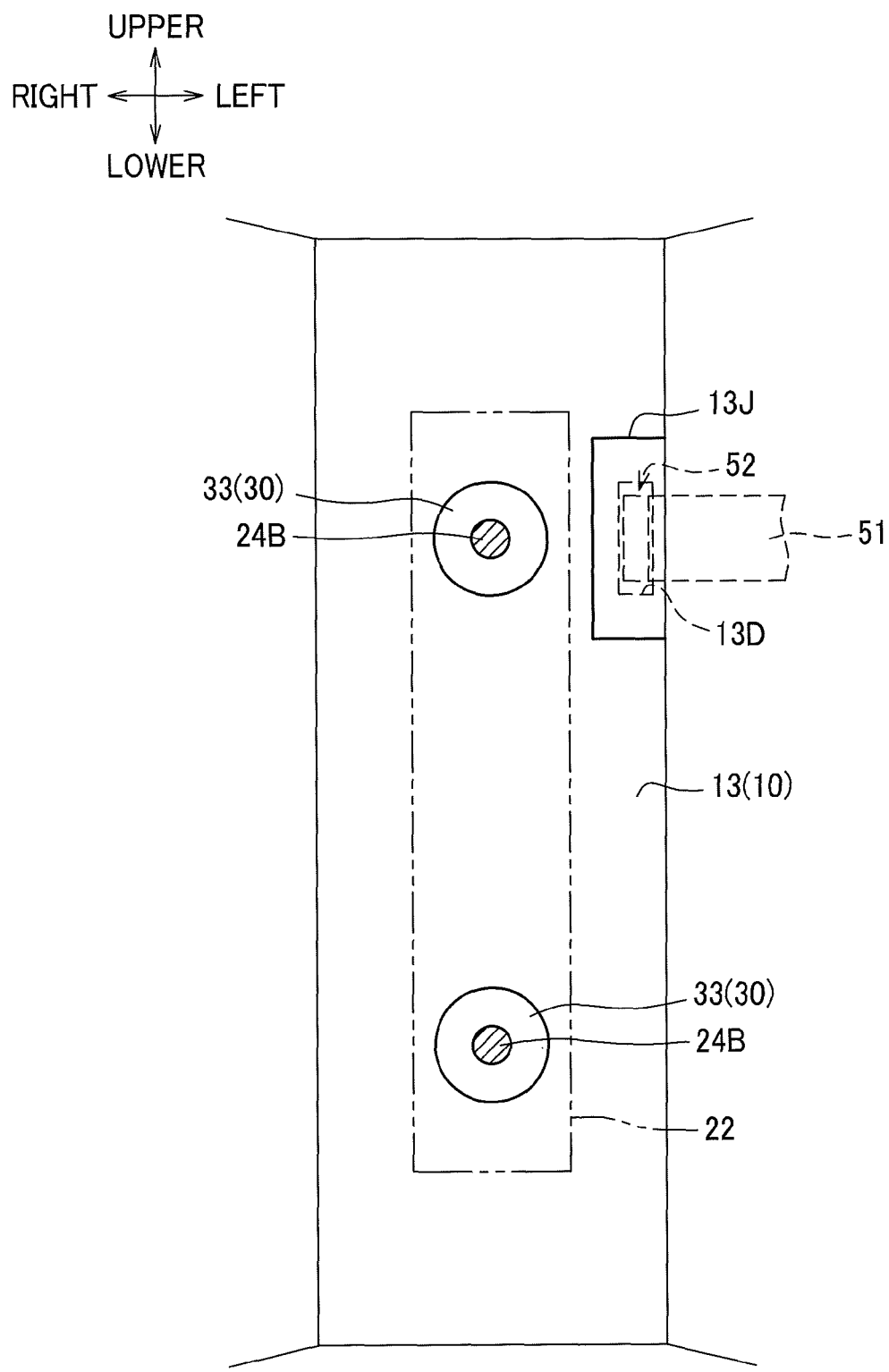
FIG. 5 is a view showing a modified example 1 in which the position of the hole is changed.

In the above-described embodiment, the hole 13D is illustrated to be disposed between the two external thread portions 24B in the upward-downward direction, but the present invention is not limited to this configuration; for example, as shown in FIG. 5, the position of the hole 13D may be located in the same position as that of the external thread portion 24B in the upward-downward direction. With this configuration, the end portion of the webbing 51 is held near the external thread portion 24B, and thus the end portion of the webbing 51 can be held more firmly at the inflator 22 side.

Figure 6:
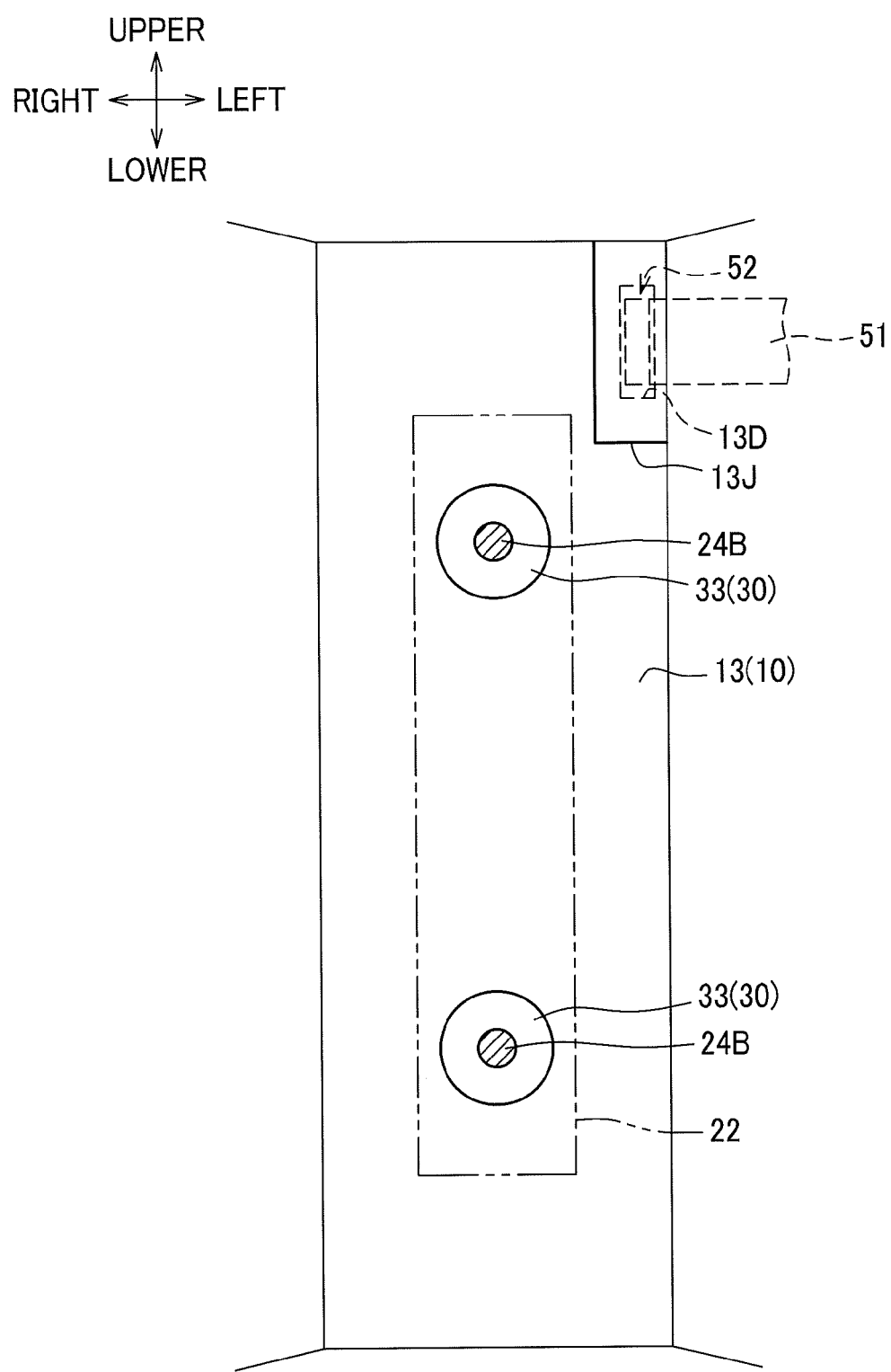
FIG. 6 is a view showing a modified example 2 in which the position of the hole is changed.

The hole 13D may be provided, as shown in FIG. 6, on an outer side in the axial direction of the two external thread portions 24B.

Figure 7:
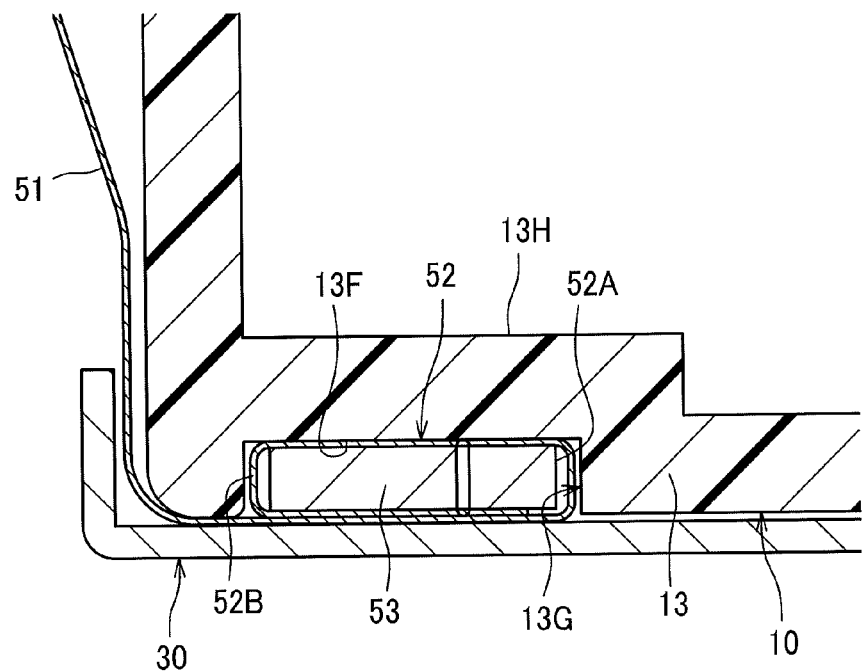
FIG. 7 is a sectional view showing a modified example 3 in which the shape of the hole is changed.

Although the above-described embodiment is illustrated to provide the hole 13D in slit form, the present invention is not limited to this configuration; for example, as shown in FIG. 7, a hole 13G having a bottom 13F parallel to the face of the engaging portion 52 in sheet form may alternatively be provided. In this configuration, the depth of the hole 13G can be designed to be shallower, and thus the volume of the bulging portion 13H surrounding the hole can be made smaller, so that the case 10 can be made lighter in weight. Moreover, as the making of the hole 13G is easier than the case of the above-described embodiment, the case 10 can be made with increased ease.

In this embodiment shown in FIG. 7, the engaging portion 52 is folded back once and disposed in the hole 13G, while the webbing 51 is routed to pass along one end 52A of the engaging portion 52 inside the hole 13G, and to extend out of the hole 13G further toward the other end 52B of the engaging portion 52. With this configuration, upon inflation of the airbag 21 which causes the webbing 51 to be pulled, the engaging portion 52 is caused to rotate, and the other end 52B of the engaging portion 52 is pressed against the bottom 13F of the hole 13G, so that the likelihood of letting the engaging portion 52 come off the hole 13G can be reduced more effectively. It is to be understood that the engaging portion 52 may be folded two or more times.

Figure 8:
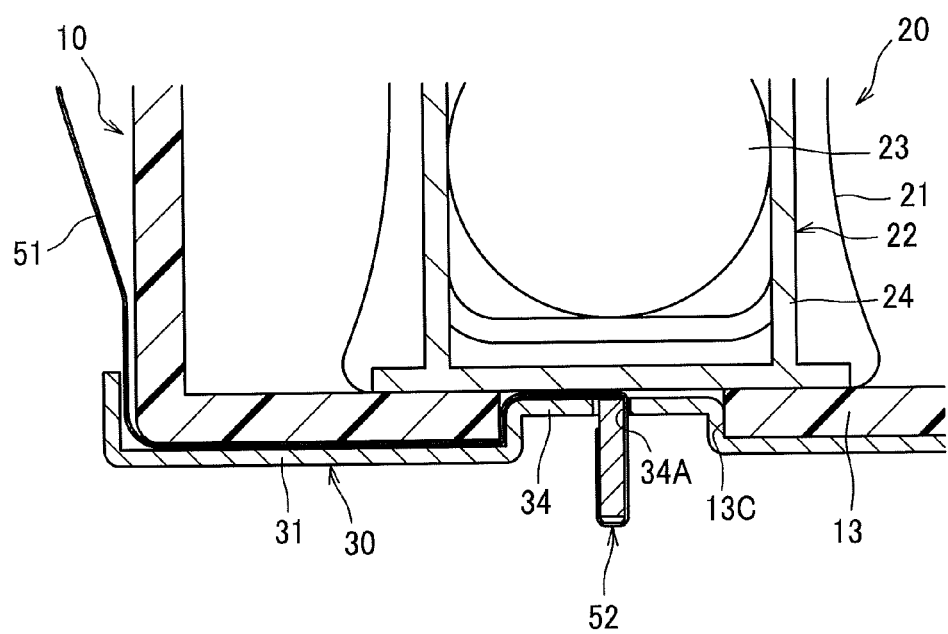
FIG. 8 is a sectional view showing a modified example 4 of the side airbag device.

In the above-described embodiment, the webbing 51 is held between the case 10 and the anchor plate 30, but the present invention is not limited to this configuration; for example, as shown in FIG. 8, the webbing 51 may be held between the inflator 22 and the anchor plate 30. In FIG. 8, for convenience's sake, illustration of the external thread portion 24B and the like which may be seen at the back of the webbing 51 in the drawing is omitted.

To be more specific, in this embodiment shown in FIG. 8, a hole 13C is formed in the bottom wall 13 of the case 10 in a position opposite to the inflator 22, and a bulging portion 34 protruding toward the inflator 22 side is formed in a position corresponding to the position of the hole 13C of the anchor plate 30, to thereby arrange the anchor plate 30 closer to the inflator 22, so that the webbing 51 can be held between them. The bulging portion 34 has an engaging hole 34A engaging with the engaging portion 52.

In detail, the hole 13C is provided between the aforementioned two mounting holes 13A, and the bulging portion 34 is provided between the aforementioned two protuberant portions 33. The directly holding the webbing 51 between the inflator 22 and the anchor plate 30 in this way enables enhancement of the firm holding of the end portion of the webbing 51 at the inflator 22 side.

Figure 9:
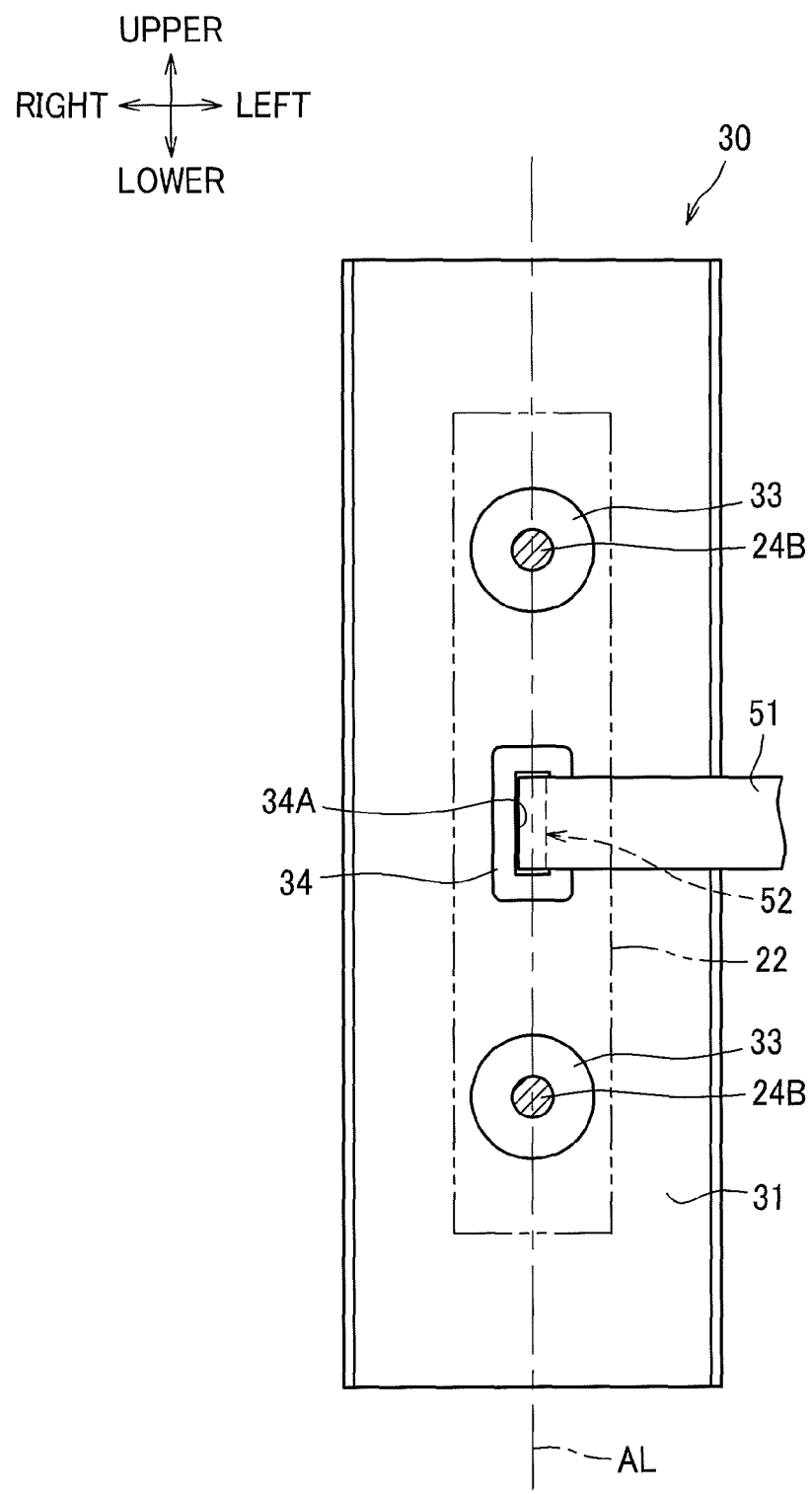
FIG. 9 is a view showing the position of the hole in the modified example 4.

In the embodiment of FIG. 8, as seen in FIG. 9, the engaging portion 52 is so disposed as to overlap the axial line AL of the inflator 22 as viewed from the direction in which the external thread portions 24B and relevant elements are applied for fastening. With this configuration, the end portion of the webbing 51 can be held more thinly between the inflator 22 and the anchor plate 30.

Figure 10:
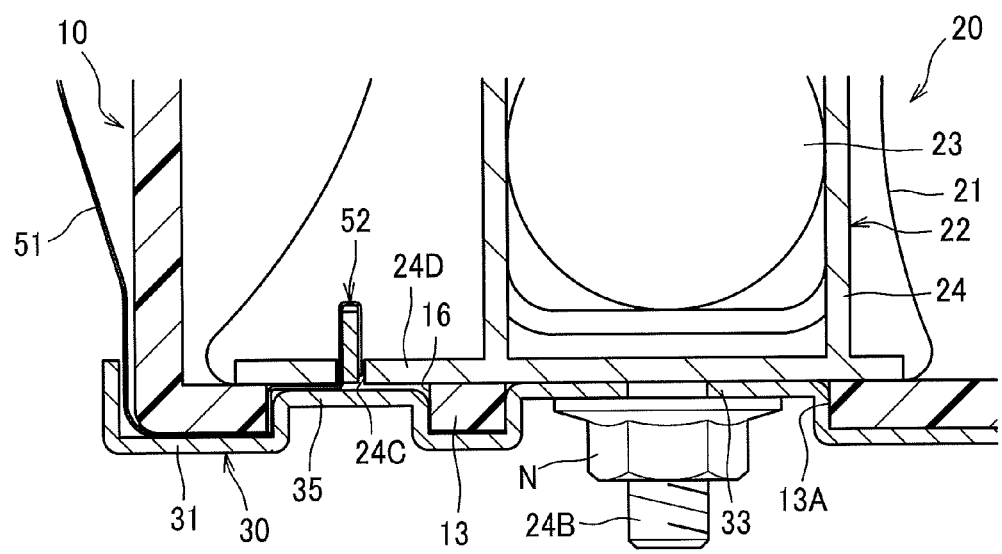
FIG. 10 is a sectional view showing a modified example 5 of the side airbag device.

In the above-described embodiment, the engaging portion 52 is engaged with the case 10, but the present invention is not limited to this configuration; for example, as shown in FIG. 10, the engaging portion 52 may be engaged with a hole 24C formed in the retainer 24. To be more specific, in the embodiment shown in FIG. 10, the retainer 24 has an extension portion 24D extending partially along the bottom wall 13, and the hole 24C is formed in this extension portion 24D. Furthermore, a hole 16 is formed in the bottom wall 13, and a bulging portion 35 protruding toward the retainer 24 is formed in the anchor plate 30 at a position corresponding to the hole 16, to thereby locate the anchor plate 30 closer to the retainer 24, so that the webbing 51 can be held between them. In this embodiment as well, the webbing 51 can be held between the inflator 22 and the anchor plate 30.

In the above-described embodiment, narrow-width webbing 51 is illustrated as a restriction member, but the present invention is not limited thereto; for example, webbing wider in width than the webbing as illustrated in the above-described embodiment may be applicable. In this alternative, a plurality of engaging portions or a wide-width engaging portion may be provided at an end portion of a single sheet of the webbing, and the webbing in the vicinity of the engaging portion may be held between an inflator and an inflator anchoring member. The number of restriction members may be more than one.

In the above-described embodiment, the engaging portion 52 is configured to include the trim cord 53 and the end portion of the webbing 51, but the present invention is not limited to this configuration: for example, an end portion of the webbing may be folded back two or more times, and thus-folded portions may be sewn to form an engaging portion.

In the above-described embodiment, the hole 13D in which the engaging portion 52 is fitted is illustrated as a hole with a bottom, but the present invention is not limited to this configuration; rather, the hole 13D may be a through hole. In the above-described embodiment, the engaging portion 52 is fitted in the hole 13D, but the present invention is not limited to this configuration; the engaging portion may be configured to engage with a hole in any way. To be more specific, a small gap may be formed between the engaging portion and the hole.

Hereinafter, a second embodiment of the present invention will be described with reference to FIGS. 11 to 19.

In describing the second embodiment, the element having substantially the same configuration in the referenced drawings as those in the first embodiment will be designated by the same reference numerals, and a description thereof will be omitted.

Figure 12:
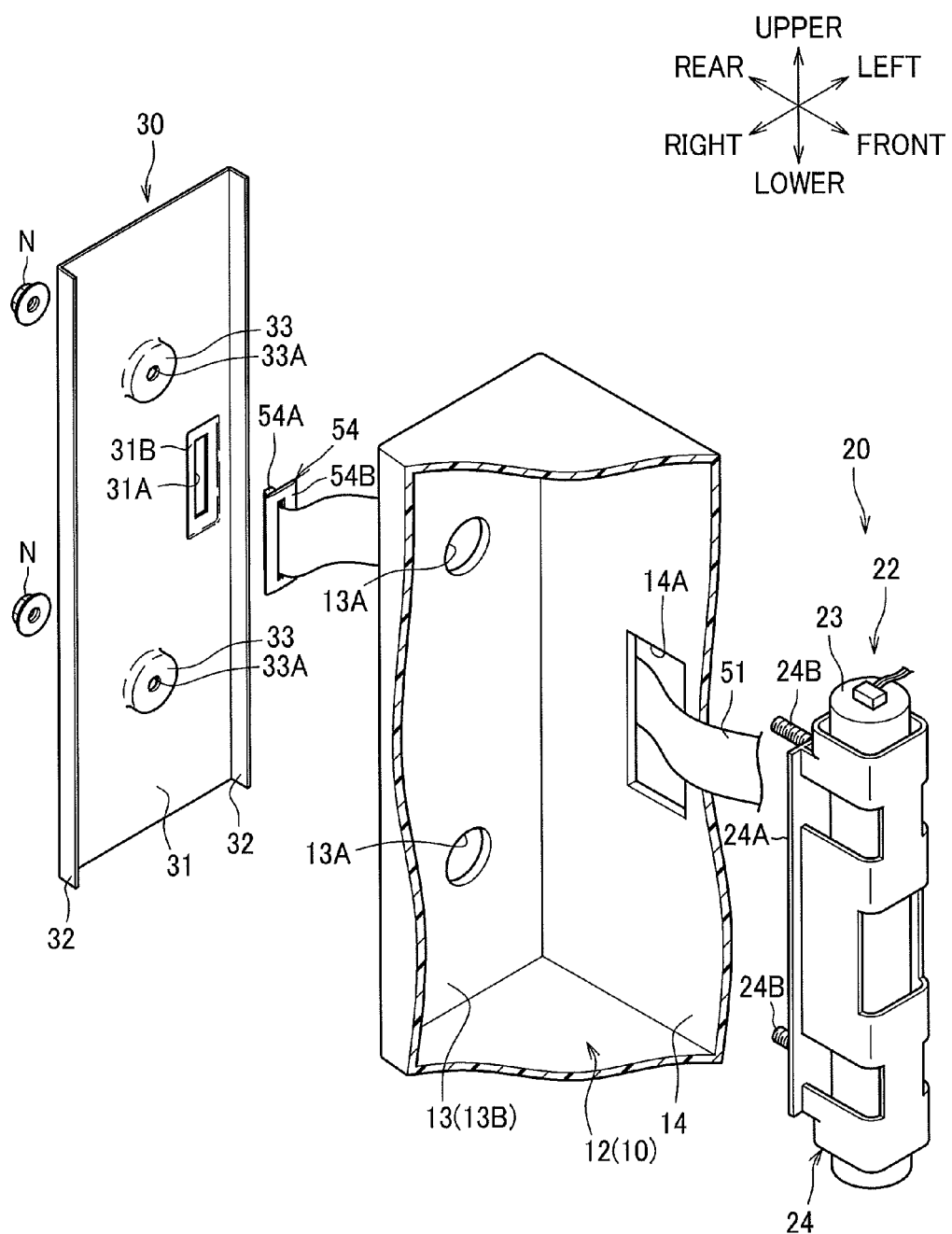
FIG. 12 is an exploded perspective view showing a structure around an inflator.

In the present embodiment, at the end portion of the webbing 51, a clip 54 as an engaging member, instead of the engaging portion 52 provided by sewing, is fixed thereto (see FIG. 12). The webbing 51 has the same width as that of the clip 54.

Figure 11:
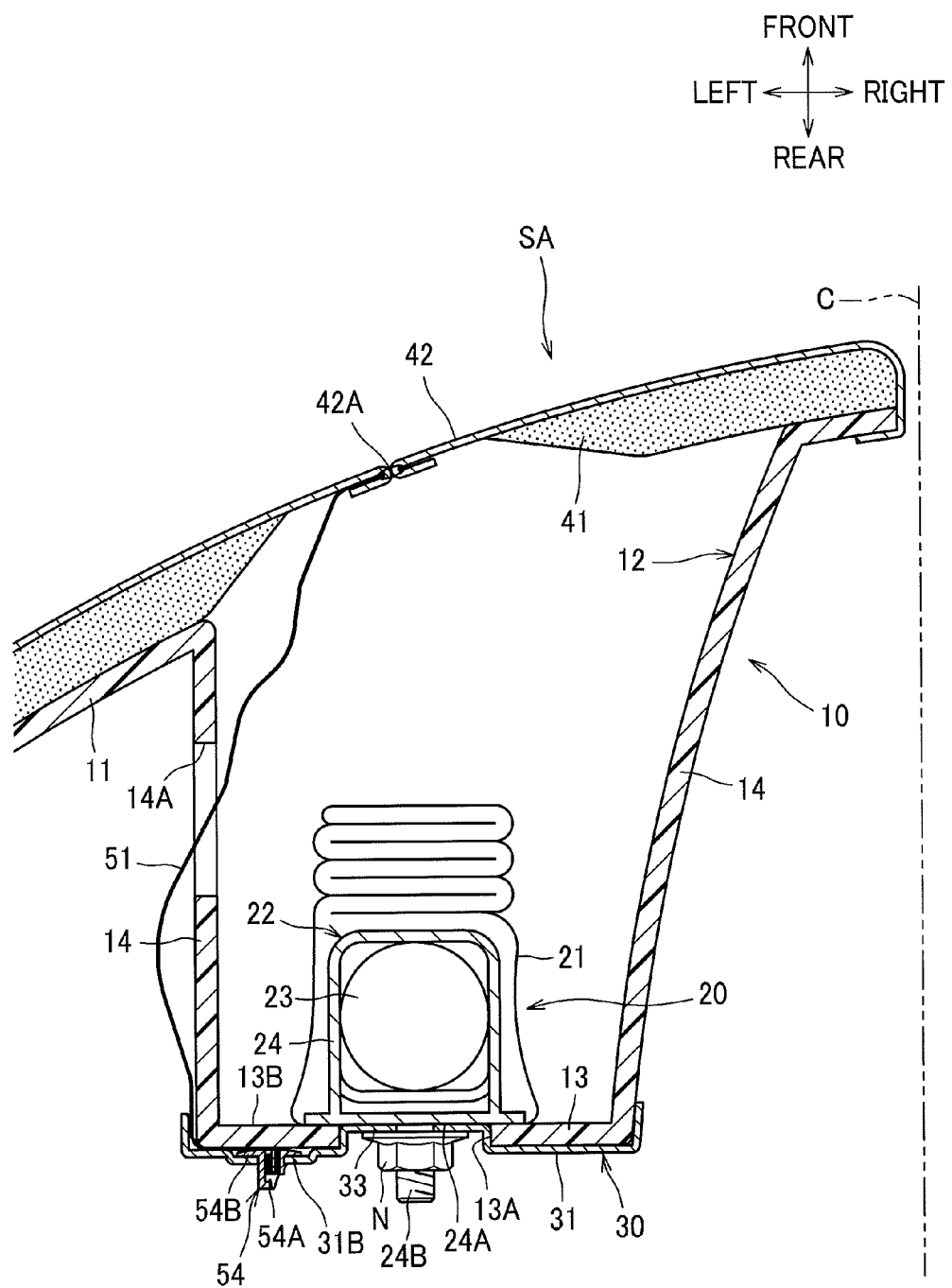
FIG. 11 is a sectional view showing a side airbag device according to a second embodiment.

As shown in FIGS. 11 and 12, in an appropriate position in the main body 31 of the anchor plate 30, to be more specific, in a position between the protuberant portions 33 in the upward-downward direction and shifted to the left relative to the protuberant portions 33, an engaging hole 31A to which the clip 54 is engageable is formed. The clip 54 is a plastic member shaped substantially like a letter T in cross section, and includes an engaging portion 54A configured to engage with the engaging hole 31A and a flange portion 54B extending from the front end of the engaging portion 54A in upward, downward, leftward and rightward directions.

A portion of the main body 31 around the engaging hole 31A is configured as a recess-shaped receptacle portion 31B configured to receive the flange portion 54B. With this configuration, as shown in FIG. 11, the bottom wall 13 can be held between the retainer 24 and the main body 31, while the flange portion 54B of the clip 54 can be held between the bottom wall 13 and the receptacle portion 31B.

In other words, the clip 54 is held together with the bottom wall 13 between the inflator 22 and the anchor plate 30. Since the clip 54 is held between the inflator 22 and the anchor plate 30, the end portion of the webbing 51 can be held firmly at the inflator 22 side.

Figure 13:
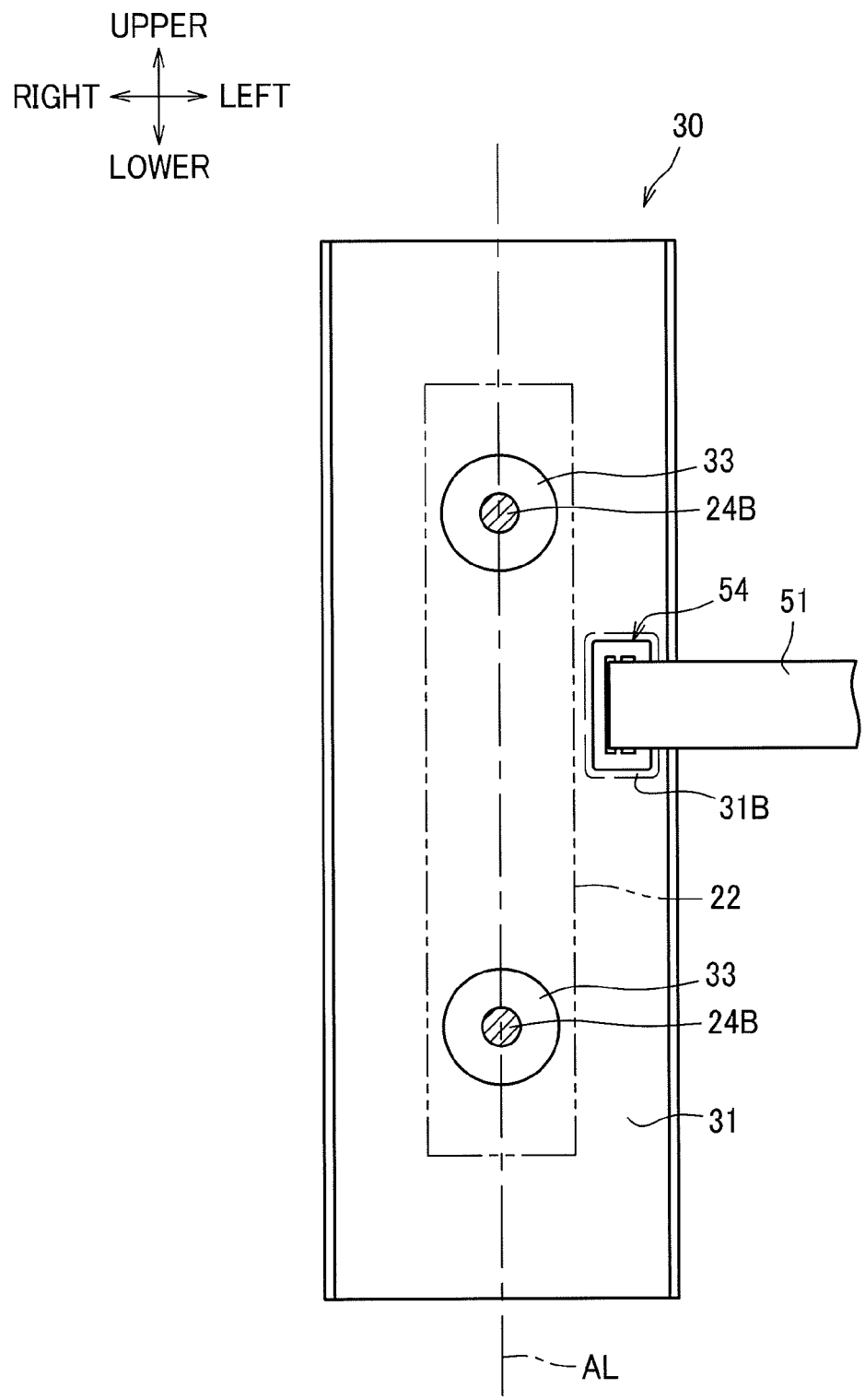
FIG. 13 is a view showing the position of a clip relative to an axial line of the inflator.

Moreover, the clip 54 attached to the engaging hole 31A located in the above-described position is so arranged as not to overlap the axial line AL of the inflator, as shown in FIG. 13 when viewed from the front-rear direction (a direction in which the inflator 22 and the anchor plate 30 hold the bottom wall 13). In other words, the clip 54 is so arranged as not to overlap a straight line passing through the two external thread portions 24B when viewed from a direction in which the external thread portions 24B and the nuts N are applied for fastening. In FIG. 13, for convenience's sake, illustration of the case 10 is omitted, and the inflator 22 is depicted by chain double-dashed lines.

Since the clip 54 is so arranged as not to overlap the axial line AL of the inflator 22 when viewed from the direction in which the external thread portions 24B and relevant parts are applied for fastening, the clip 54 can be attached irrespective of the attachment of the inflator 22, so that the maintainability of the side airbag device SA can be enhanced.

To be more specific, the clip 54 is provided in a position avoiding the respective protuberant portions 33. With this arrangement, the clip 54 can be supported stably at a portion of the main body 31 other than the protuberant portions 33.

The clip 54 is provided between the two external thread portions 24B in the upward-downward direction. With this arrangement, the clip 54 and the bottom wall 13 can be firmly held by the portion between the two external thread portions 24B which is considered to be less likely to bend than any other portion in the region which the retainer 24 and the anchor plate 30 are provided, so that the end portion of the webbing 51 can be held more firmly at the inflator 22 side.

According to the present embodiment described above, the following advantages, in addition to the advantages mentioned above, can be achieved.

Since the rear surface 24A of the retainer 24 is configured to be a flat surface parallel to the front side 13B of the bottom wall 13, an broadened area of coverage of the fastening strength of the external thread portions 24B and the nuts N can be ensured, and thus the degree of flexibility in the arrangement of the clip 54 can be increased.

Since the through hole 14A (second opening) for allowing the webbing 51 to pass therethrough is formed in the side wall 14, the rigidity of the bottom wall 13 can be enhanced in comparison, for example, with an alternative construction in which a through hole is formed in the bottom wall; therefore, the end portion of the webbing 51 can be held more firmly at the inflator 22 side.

Since the protuberant portions 33 for directly fastening the metal anchor plate 30 and the metal retainer 24 together are integrally provided in the anchor plate 30, the number of parts can be reduced and the formation of the case 10 can be performed with increased ease, in comparison, for example, with an alternative construction in which the tubular collars made of metal are inserted in a mold and formed integrally with the case so that the retainer and the anchor plate are fastened together through the collars.

The second embodiment of the present invention has been described above, but it is to be understood that the present embodiment can be implemented in a modified form, as will be described below with reference to some other embodiments. In the following description, the same elements in construction as those in the above-described embodiments will be designated by the same reference numerals, and a description thereof will be omitted.

Figure 14:
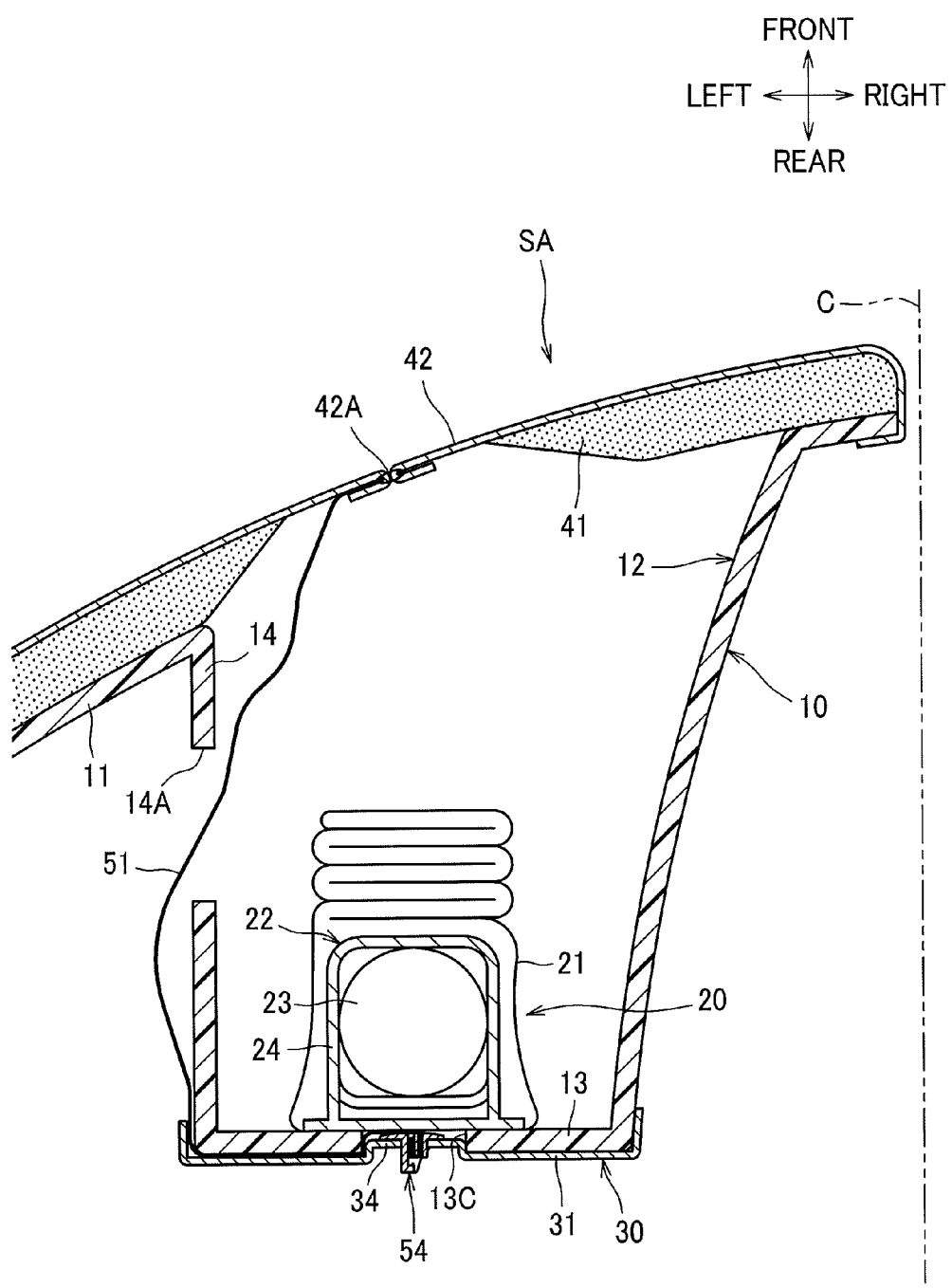
FIG. 14 is a sectional view showing a modified example 6 of the side airbag device.

In the second embodiment, the clip 54 is held between the case 10 and the anchor plate 30, but the present invention is not limited to this configuration; for example, as shown in FIG. 14, the clip 54 may be held between the inflator 22 and the anchor plate 30. In FIG. 14, for convenience's sake, illustration of the thread portion 24B and other elements which may be seen at the back of the clip 54 in the drawing is omitted.

To be more specific, in this embodiment shown in FIG. 14, a hole 13C is formed in the bottom wall 13 of the case 10 in a position opposite to the inflator 22, and a bulging portion 34 protruding toward the inflator 22 side is formed in a position corresponding to the position of the hole 13C of the anchor plate 30, to thereby arrange the anchor plate 30 closer to the inflator 22, so that the clip 54 can be held between them.

In detail, the hole 13C is provided between the aforementioned two mounting holes 13A (first opening(s)), and the bulging portion 34 is provided between the aforementioned two protuberant portions 33. The directly holding the clip 54 between the inflator 22 and the anchor plate 30 in this way enables enhancement of the firm holding of the end portion of the webbing 51 at the inflator 22 side.

Figure 15:
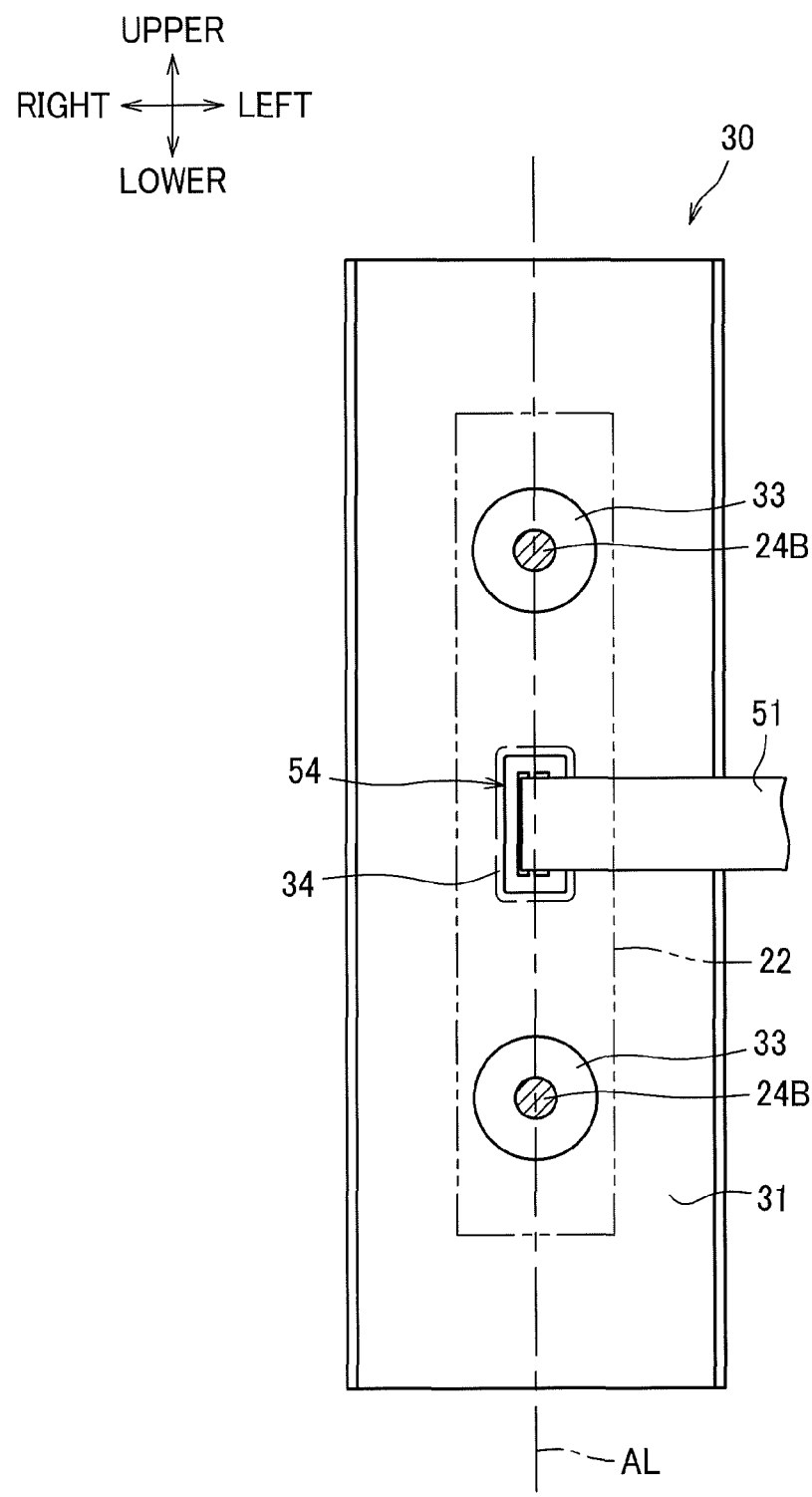
FIG. 15 is a view showing the position of the clip in the modified example 1.

In the embodiment shown in FIG. 14, the clip 54 is so disposed as to overlap the axial line AL of the inflator 22 as viewed from the direction in which the external thread portions 24B and relevant elements are applied for fastening, as shown in FIG. 15. With this configuration, the clip 54 can be held in stable balance between the inflator 22 and the anchor plate 30, and thus the end portion of the webbing 51 can be held more firmly at the inflator 22 side.

Figure 16:
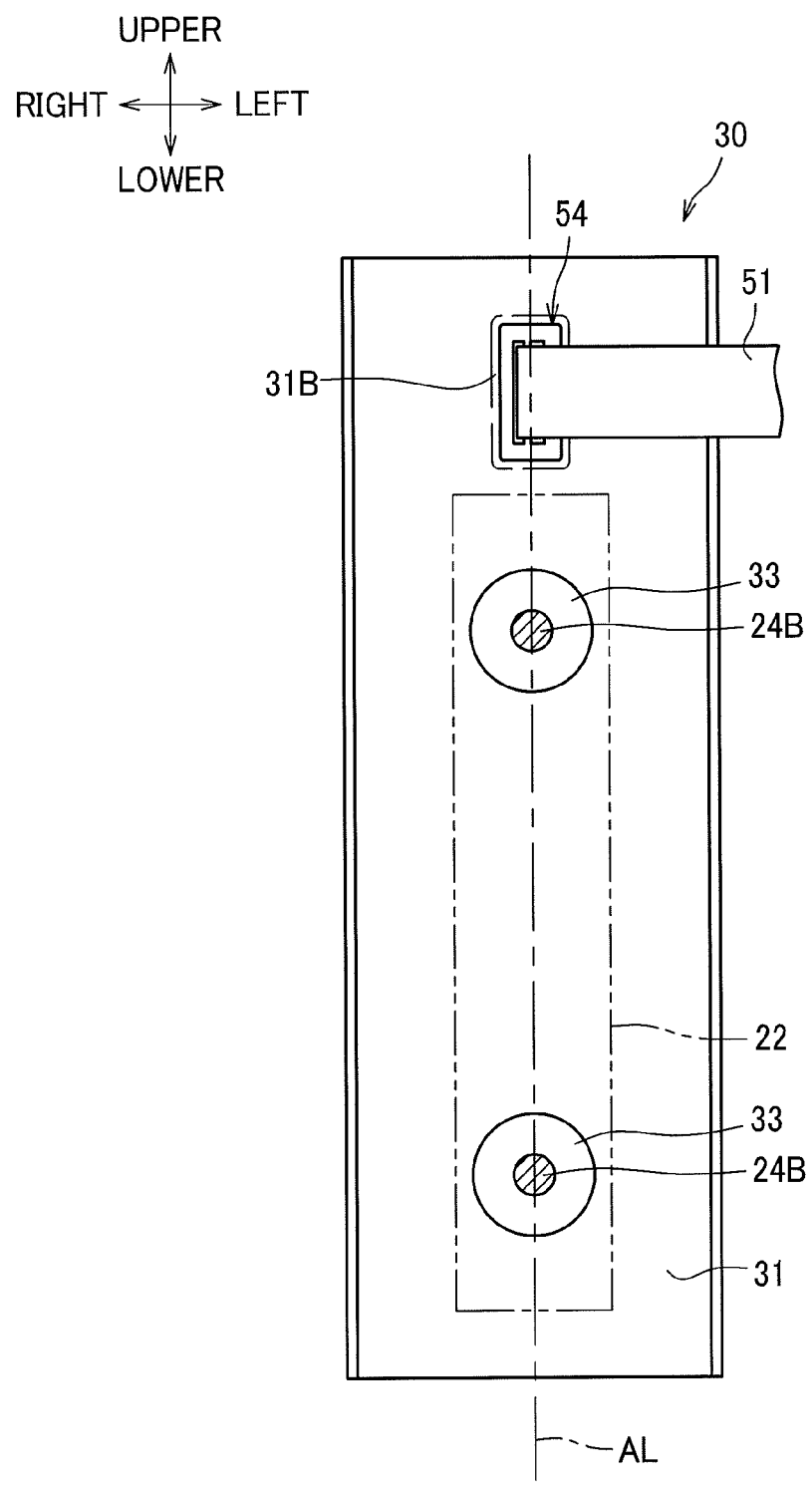
FIG. 16 is a view showing a modified example 7 in which the position of the clip is changed.

The clip 54 may be provided, for example, as shown in FIG. 16, on an outer side (in the axial direction) of the two external thread portions 24B. In this instance, the positions of the receptacle portion 31B and the engaging hole 31A (not shown) in the second embodiment may be arranged on the outer side, in the axial direction, of the two external thread portions 24B.

Figure 17:
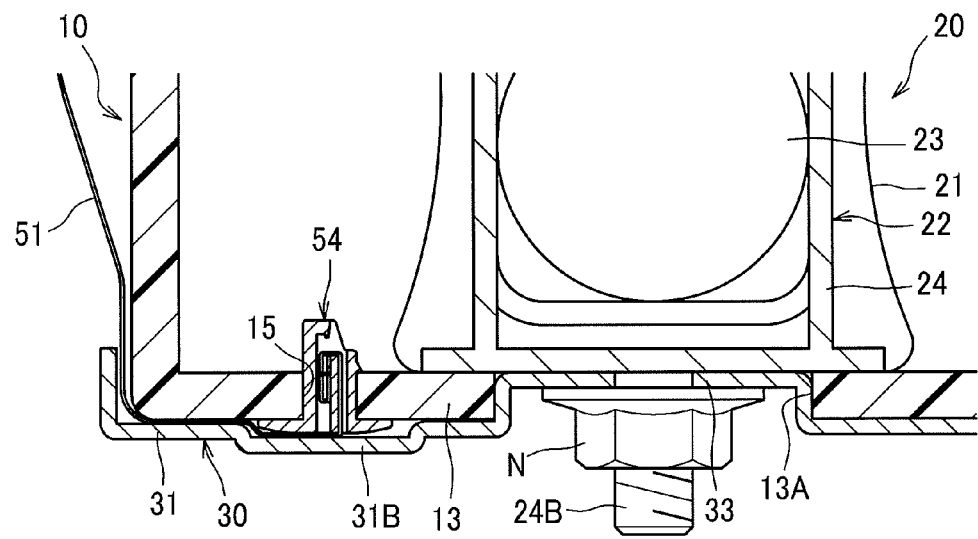
FIG. 17 is a sectional view showing a modified example 8 of the side airbag device.

In the second embodiment, the clip 54 is engaged with the anchor plate 30, but the present invention is not limited to this configuration; for example, as shown in FIG. 17, the clip 54 may be engaged with a hole 15 formed in the case 10. To be more specific, in the embodiment shown in FIG. 17, instead of the engaging hole 31A provided in the second embodiment, the hole 15 is formed in the case 10. In this configuration as well, the clip 54 can be held between the inflator 22 and the anchor plate 30 indirectly through the bottom wall 13.

Figure 18:
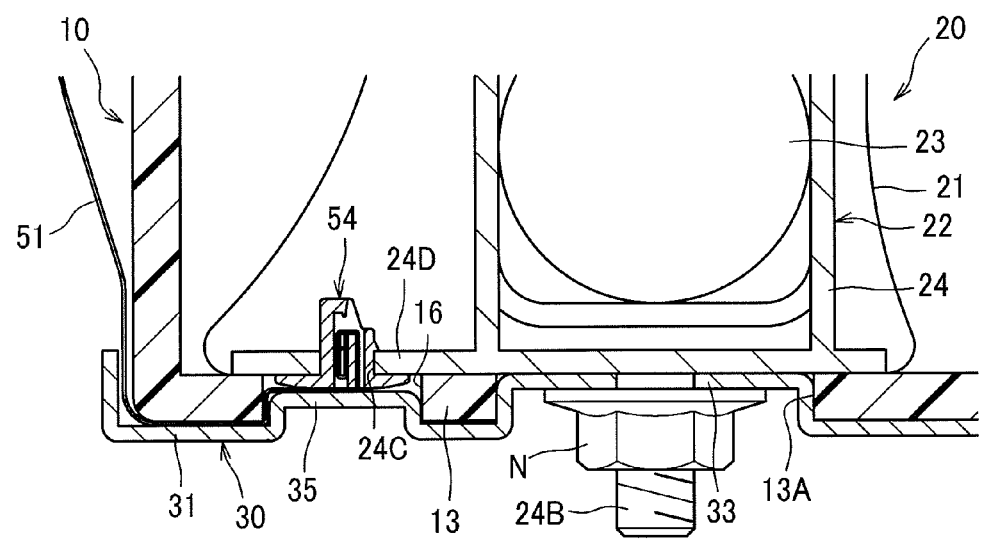
FIG. 18 is a sectional view showing a modified example 9 of the side airbag device.

Furthermore, as shown in FIG. 18, the clip 54 may be engaged with a hole 24C formed in the retainer 24. To be more specific, in the configuration shown in FIG. 18, an extension portion 24D extending along the bottom wall 13 is formed as a part of the retainer 24, and a hole 24C is formed in this extension portion 24D. Moreover, a hole 16 is formed in the bottom wall 13, and a bulging portion 35 protruding toward the retainer 24 side is formed in a position of the anchor plate 30 corresponding to the position of the hole 16, to thereby arrange the anchor plate 30 closer to the inflator 22, so that the clip 54 can be held between them. In this configuration as well, the clip 54 can be held between the inflator 22 and the anchor plate 30.

In the second embodiment, the clip 54 is illustrated to exemplify the engaging member, but the present invention is not limited to this configuration; for example, as shown in FIGS. 19 (a) and (b), a metal plate 55 configured as an engaging member may be attached to the end portion of the webbing 51. To be more specific, in the configuration shown in FIG. 19, the plate 55 has a slit 55A for attaching the webbing 51, and an engaging hole 55B for the external thread portion 24B to be inserted for engagement.

The above-described protuberant portion 33 formed in the anchor plate 30 is made low to accommodate the thickness of the plate 55. In this configuration, the external thread portion 24B is inserted through the engaging hole 55B of the plate 55 and the insertion hole 33A of the protuberant portion 33 in this order, and the nut N is screwed on this external thread portion 24B, so that the plate 55 can be held between the inflator 22 and the anchor plate 30.

In the second embodiment, the webbing 51 of which the width is substantially the same as the width of the clip 54 is illustrated to exemplify the restriction member, but the present invention is not limited to this configuration; for example, webbing may have a width wider than the clip. In this configuration, a plurality of clips may be provided at the end portion of a single sheet of webbing, and these clips may be held between the inflator and the inflator anchoring member. Furthermore, the number of restriction members may be two or more.

The first and second embodiments and their modified examples illustrate the bottom wall 13 of the recess-shaped portion 12 as an example of the mount wall, but the present invention is not limited to this configuration; for example, the case may be configured to have a stepped portion which retreats from the front wall rearward, and the mount wall may be a wall portion retreating rearward at the stepped portion.

The first and second embodiments and their modified examples illustrate the anchor plate 30 in sheet form as an example of the inflator anchoring member, but the present invention is not limited to this configuration; a member that is thick-walled but not in sheet form may be adopted as the inflator anchoring member.

The first and second embodiments and their modified examples illustrate the external thread portions 24B formed integrally with the retainer 24 and the nuts N screwed on the external thread portions 24B as an example of the mounting member, but the present invention is not limited to this configuration; for example, any other fastening member comprising internal thread portions formed integrally with the retainer and screws screwed in the internal thread portions, or a clip engageable with the retainer and the anchor plate to hold them may be adopted for that purpose.

The first and second embodiments and their modified examples illustrate the protuberant portions 33 as formed by press working, but the present invention is not limited to this configuration; for example, the anchor plate may be formed by casting, and a thick-walled portion thicker than any other portion may be adopted.

The mounting hole 13A and the through hole 14A illustrated in the first and second embodiments and their modified examples may not be configured as a hole, but an opening like a notch may be adopted. To be more specific, the first opening may not be a hole (mounting hole 13A), but may be, for example, a cutaway portion which opens to one end of the mount wall, instead. Also, the second opening may not be a hole (through hole 14A) as in the above-described embodiment, but may be, for example, a cutaway portion which opens to one end of the side wall.

Although the first and second embodiments and their modified examples are configured to provide two pairs of the mounting member (external thread portions 24B; nuts N), the present invention is not limited to this configuration, and three or more pairs of the mounting member may be provided.

The invention claimed is:

1. A side airbag device provided between a vehicle body and a seat, the side airbag device comprising:
   an inflator that is configured to inject gas into an airbag;
   a case defining an outer shape of the side air bag device;
   an inflator anchoring member that is fixed on a rear side of the case, the inflator anchoring member including a wall disposed at a rear side of the inflator;

a mounting member provided to fix the inflator to the inflator anchoring member;
an outer covering material that is configured to cover the case;
a restriction member that is fixed at a position around a seam of the outer covering material, and configured to restrict a direction of deployment of the airbag; and
an engaging member that is provided at an end portion of the restriction member, and configured to be held between the inflator and the inflator anchoring member,
wherein a portion of the engaging member, to which an end portion of the restriction member is attached, is disposed at a front side of the wall, and overlaps the wall as viewed from a front or a rear side, and
the inflator anchoring member includes left and right flange portions extending from left and right ends of the wall frontward.

2. A side airbag device provided between a vehicle body and a seat, the side airbag device comprising:
an inflator that is configured to inject gas into an airbag;
an inflator anchoring member including a wall disposed at a rear side of the inflator;
a mounting member provided to fix the inflator to the inflator anchoring member;
a restriction member that is fixed at a position around a seam of an outer covering material, and configured to restrict a direction of deployment of the airbag; and
an engaging member that is provided at an end portion of the restriction member, and configured to be held between the inflator and the inflator anchoring member,
wherein a portion of the engaging member, to which an end portion of the restriction member is attached, is disposed at a front side of the wall, and overlaps the wall as viewed from a front or rear side, and
the inflator anchoring member includes a protuberant portion protruding toward the inflator, the protuberant portion being fixed to the inflator by the mounting member.

3. The side airbag device according to claim 1, wherein the mounting member includes an external thread portion provided on the inflator,
the inflator anchoring member includes a bulging portion protruding in a direction opposite to a direction of protrusion of the external thread portion, and
the engaging portion and the bulging portion are arranged in this sequence in the direction of protrusion of the external thread portion.

4. The side airbag device according to claim 1, wherein the restriction member is disposed to overlap the inflator anchoring member as viewed from left or right.

5. The side airbag device according to claim 1, wherein the engaging member and the inflator anchoring member are disposed in a rearward position relative to an axial line of the inflator.

6. The side airbag device according to claim 1, wherein the inflator anchoring member includes a protuberant portion protruding toward the inflator, the protuberant portion being fixed to the inflator by the mounting member.

7. The side airbag device according to claim 1, wherein the mounting member includes a plurality of external thread portions provided on the inflator, and
the inflator anchoring member includes a plurality of protuberant portions protruding toward the inflator in positions corresponding to the plurality of external thread portions, each of the plurality of protuberant portions being fixed to the inflator by the mounting member.

8. The side airbag device according to claim 1, wherein the mounting member includes an external thread portion provided on the inflator and a nut to be screwed on the external thread portion, the external thread portion protruding from the inflator anchoring member through a hole provided in the inflator anchoring member.

9. The side airbag device according to claim 1, wherein the engaging member includes an engaging portion configured to engage with a hole formed in the inflator, and a flange portion extending from a rear end of the engaging portion in upward, downward, leftward and rightward directions.

10. The side airbag device according to claim 1, wherein the engaging member is disposed in a position shifted from the mounting member to left or right side.

11. The side airbag device according to claim 2, wherein the restriction member is disposed to overlap the inflator anchoring member as viewed from left or right.

12. The side airbag device according to claim 2, wherein the mounting member includes a plurality of external thread portions provided on the inflator, and
the inflator anchoring member includes a plurality of protuberant portions protruding toward the inflator in positions corresponding to the plurality of external thread portions, each of the plurality of protuberant portions being fixed to the inflator by the mounting member.

13. The side airbag device according to claim 2, wherein the mounting member includes an external thread portion provided on the inflator and a nut to be screwed on the external thread portion, the external thread portion protruding from the inflator anchoring member through a hole provided in the inflator anchoring member.

14. The side airbag device according to claim 2, wherein the inflator anchoring member includes left and right flange portions extending from left and right ends of the wall frontward.

15. A side airbag device provided between a vehicle body and a seat, the side airbag device comprising:
an inflator that is configured to inject gas into an airbag;
an inflator anchoring member including a wall disposed at a rear side of the inflator;
a mounting member provided to fix the inflator to the inflator anchoring member;
a restriction member that is fixed at a position around a seam of an outer covering material, and configured to restrict a direction of deployment of the airbag; and
an engaging member that is provided at an end portion of the restriction member, and configured to be held between the inflator and the inflator anchoring member,
wherein a portion of the engaging member to which an end portion of the restriction member is attached is disposed at a front side of the wall, and overlaps the wall as viewed from a front or a rear side, and
the engaging member includes an engaging portion configured to engage with a hole formed in the inflator, and a flange portion extending from a rear end of the engaging portion in upward, downward, leftward and rightward directions.

16. The side airbag device according to claim 15, wherein the mounting member includes an external thread portion provided on the inflator,
wherein the inflator anchoring member includes a bulging portion protruding in a direction opposite to a direction of protrusion of the external thread portion, and the engaging portion and the bulging portion are arranged in this sequence in the direction of protrusion of the external thread portion.

17. The side airbag device according to claim 15, wherein the restriction member is disposed to overlap the inflator anchoring member as viewed from left or right.

18. The side airbag device according to claim 15, wherein the engaging member and the inflator anchoring member are disposed in a rearward position relative to an axial line of the inflator.

19. The side airbag device according to claim 15, wherein the mounting member includes an external thread portion provided on the inflator and a nut to be screwed on the external thread portion, the external thread portion protruding from the inflator anchoring member through another hole provided in the inflator anchoring member.

* * * * *